US012592211B2

(12) United States Patent
Sanford et al.

(10) Patent No.: US 12,592,211 B2
(45) Date of Patent: Mar. 31, 2026

(54) DUAL-VOLTAGE PIXEL CIRCUITRY FOR LIQUID CRYSTAL DISPLAY

(71) Applicant: Snap Inc., Santa Monica, CA (US)

(72) Inventors: James L. Sanford, Wappingers Falls, NY (US); Howard V. Goetz, Tigard, OR (US); Stewart S. Taylor, Beaverton, OR (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/045,348

(22) Filed: Feb. 4, 2025

(65) Prior Publication Data

US 2025/0182714 A1 Jun. 5, 2025

Related U.S. Application Data

(63) Continuation of application No. 18/252,462, filed as application No. PCT/US2020/064153 on Dec. 10, 2020, now Pat. No. 12,249,294.

(51) Int. Cl.
*G09G 3/36* (2006.01)

(52) U.S. Cl.
CPC ... *G09G 3/3696* (2013.01); *G09G 2300/0828* (2013.01); *G09G 2300/0838* (2013.01); *G09G 2300/0857* (2013.01)

(58) Field of Classification Search
CPC .. G09G 3/3233; G09G 3/3648; G09G 3/3688; G09G 3/3291; G09G 3/20; G09G 3/3258; G09G 3/36; G09G 3/3677; G09G 2300/0842; G09G 2300/0819; G09G 2300/0861; G09G 2300/0426; G09G 2330/021; G09G 2320/043;
(Continued)

(56) References Cited

U.S. PATENT DOCUMENTS

2002/0149549 A1* 10/2002 Ohta .................... G09G 3/3655
345/87
2003/0103026 A1 6/2003 Yamakawa et al.
(Continued)

FOREIGN PATENT DOCUMENTS

CN 1366291 A 8/2002
CN 101276550 A 10/2008
(Continued)

OTHER PUBLICATIONS

"U.S. Appl. No. 18/252,462, Examiner Interview Summary mailed Jul. 10, 2024", 2 pgs.
(Continued)

*Primary Examiner* — Dong Hui Liang
(74) *Attorney, Agent, or Firm* — Schwegman Lundberg & Woessner, P.A.

(57) ABSTRACT

Systems and methods for a digital pixel circuit for liquid crystal displays are provided. The design includes a dual-voltage pixel design, a two-transistor level-shift circuit design, self-adjusting transistor bias circuitry; and an optional on-chip test-array to determine die-specific design-center values for critical transistor leakage and threshold parameters. Level shift design simplicity, small pixel pitch, and applicability for small display applications such as microdisplays, are among the various benefits and advantages obtained.

20 Claims, 12 Drawing Sheets

(58) Field of Classification Search
CPC ... G09G 2320/0233; G09G 2320/0295; G09G 2320/0285; G09G 2320/045; G09G 2310/027; G09G 2310/08; G09G 2310/0286; G09G 2310/0289
See application file for complete search history.

(56) References Cited

U.S. PATENT DOCUMENTS

| | | | | |
|---|---|---|---|---|
| 2006/0158421 | A1 | 7/2006 | Masuko | |
| 2007/0242021 | A1* | 10/2007 | Murakami | G09G 3/3611 345/98 |
| 2007/0279366 | A1 | 12/2007 | Kageyama et al. | |
| 2008/0231568 | A1* | 9/2008 | Chen | G09G 3/346 345/84 |
| 2012/0086733 | A1 | 4/2012 | Hudson et al. | |
| 2016/0077367 | A1 | 3/2016 | Lo et al. | |
| 2017/0330509 | A1 | 11/2017 | Cok et al. | |
| 2021/0256901 | A1 | 8/2021 | Hudson et al. | |
| 2023/0377532 | A1 | 11/2023 | Sanford et al. | |
| 2024/0296811 | A1 | 9/2024 | Kyles et al. | |
| 2025/0232741 | A1 | 7/2025 | Kyles et al. | |

FOREIGN PATENT DOCUMENTS

| | | | |
|---|---|---|---|
| CN | 116762122 | A | 9/2023 |
| EP | 1091343 | A2 | 4/2001 |
| KR | 102626220 | B1 | 1/2024 |
| TW | 200947388 | A | 11/2009 |
| TW | 201131271 | A | 9/2011 |
| TW | 202004717 | A | 1/2020 |
| WO | WO-2012045229 | A1 | 4/2012 |
| WO | WO-2021141953 | A1 | 7/2021 |
| WO | WO-2022125089 | | 6/2022 |
| WO | WO-2024182618 | A1 | 9/2024 |

OTHER PUBLICATIONS

"U.S. Appl. No. 18/252,462, Examiner Interview Summary mailed Oct. 18, 2024", 2 pgs.
"U.S. Appl. No. 18/252,462, Final Office Action mailed Sep. 10, 2024", 12 pgs.
"U.S. Appl. No. 18/252,462, Non Final Office Action mailed Apr. 23, 2024", 11 pgs.
"U.S. Appl. No. 18/252,462, Notice of Allowance mailed Nov. 6, 2024", 9 pgs.
"U.S. Appl. No. 18/252,462, Response filed Jun. 18, 2024 to Non Final Office Action mailed Apr. 23, 2024", 9 pgs.
"U.S. Appl. No. 18/252,462, Response filed Oct. 24, 2024 to Final Office Action mailed Sep. 10, 2024", 8 pgs.
"U.S. Appl. No. 18/440,675, Notice of Allowance mailed Jan. 2, 2025", 10 pgs.
"U.S. Appl. No. 18/440,675, Notice of Allowance mailed Sep. 28, 2024", 10 pgs.
"Chinese Application Serial No. 202080107838.4, Voluntary Amendment filed Nov. 28, 2023".
"European Application Serial No. 21702553.5, Communication Pursuant to Article 94(3) EPC mailed May 3, 2023", 14 pgs.
"International Application Serial No. PCT/US2021/012262, International Preliminary Report on Patentability mailed Jul. 21, 2022", 18 pgs.
"International Application Serial No. PCT/US2021/012262, International Search Report mailed Mar. 24, 2021", 3 pgs.
"International Application Serial No. PCT/US2021/012262, Written Opinion mailed Mar. 24, 2021", 16 pgs.
"Korean Application Serial No. 10-2022-7027158, Notice of Preliminary Rejection mailed Jul. 21, 2023", W/English Translation, 17 pgs.
"Korean Application Serial No. 10-2022-7027158, Office Action mailed Aug. 9, 2022", W/O English Translation, 2 pgs.
"Korean Application Serial No. 10-2023-7022746, Response filed Jul. 22, 2024 to Notice of Preliminary Rejection mailed May 22, 2024", w/ English claims, 16 pgs.
"Taiwanese Application Serial No. 109144233, Office Action mailed Nov. 11, 2024", w/ English Translation, 8 pgs.
"Taiwanese Application Serial No. 109144233, Response filed Jan. 22, 2025 to Office Action mailed Nov. 11, 2024", w/ current English claims, 60 pgs.
"U.S. Appl. No. 18/440,675, Notice of Allowance mailed Jul. 2, 2025", 10 pgs.
"U.S. Appl. No. 18/440,675, Notice of Allowance mailed Jul. 16, 2025", 10 pgs.
"Chinese Application Serial No. 202080107838.4, Office Action mailed Jun. 19, 2025", w/ English Translation, 20 pgs.
"European Application Serial No. 20849004.5, Communication Pursuant to Article 94(3) EPC mailed Apr. 23, 2025", 12 pgs.
"European Application Serial No. 20849004.5, Response to Communication Pursuant to Rules 161 and 162 EPC filed Oct. 5, 2023", 11 pgs.
"Taiwanese Application Serial No. 114120922, Office Action mailed Jul. 3, 2025", w/ English Translation, 7 pgs.
"Taiwanese Application Serial No. 114120922, Response filed Aug. 13, 2025 to Office Action mailed Jul. 3, 2025", w/ English Claims, 15 pgs.
"International Application Serial No. PCT/US2024/017888, International Preliminary Report on Patentability mailed Sep. 11, 2025", 15 pgs.
"Chinese Application Serial No. 202080107838.4, Response filed Sep. 30, 2025 to Office Action mailed Jun. 19, 2025", w/ English Claims, 14 pgs.
"Korean Application Serial No. 10-2025-7010562, Notice of Preliminary Rejection mailed Oct. 23, 2025", w/ English translation, 4 pgs.

* cited by examiner

DUAL-VOLTAGE PIXEL CIRCUITRY FOR LIQUID CRYSTAL DISPLAY

CROSS-REFERENCE TO RELATED APPLICATION

This application is a continuation of U.S. patent application Ser. No. 18/252,462, filed May 10, 2023, which application is a U.S. National Stage Filing under 35 U.S.C. 371 from International Application No. PCT/US2020/064153, filed on 10 Dec. 2020, and published as WO 2022/125089 on 16 Jun. 2022, which applications are incorporated herein by reference in their entireties.

TECHNICAL FIELD

The present disclosure relates to displays. More particularly, the present disclosure relates to systems and methods for providing a digital pixel circuit for spatial light modulators, such as electrically addressed spatial light modulators, Liquid Crystal displays, Liquid Crystal-on-Silicon (LCoS) displays, microdisplays, micro Light Emitting Diode (microLED displays), etc. The present disclosure provides, for example, a dual-voltage circuit that enables said displays to have an extremely small pixel pitch among other benefits and advantages.

BACKGROUND

Liquid Crystal displays, such as LCoS displays, are well known in the display industry. These devices are generally small, since they are built on silicon wafers like other Integrated Circuits (ICs). A wafer herein refers to the substrate in or on which microelectronic devices, such as pixel circuity for displays, are built. An LCOS typically includes a matrix of pixels, arranged in a plurality of rows and columns, where an intersection of a row and a column defines a position of a pixel in the matrix. An LCoS display at the die level typically consists of a regular array of square pixel electrodes, with pixel circuitry underneath each pixel, and such pixel circuitry is built in or on a silicon wafer using standard IC techniques. A layer of Liquid Crystal overlays the array of pixel electrodes, with, for example, a transparent conductive layer on the underside of a top-glass cover layer. In operation, voltages are driven by the pixel circuitry onto the pixel electrodes, and a common voltage is driven onto the conductive layer on the cover glass. The voltage difference between the pixel electrodes and the cover glass forms an electric field through the Liquid Crystal that affects its polarization or phase-shift, depending on the type of LCoS. Row and column circuitry on the die is used to send data and control inputs to the individual pixel circuits, and typically an external driver IC is used to format image data into pixel data and control inputs sent through these buses to the individual pixel circuits. In this way, a display capable of forming images through polarization control or phase-shift control of the Liquid Crystal pixels is made.

Conventional LCoS displays operate at a single supply voltage (e.g., 4-10V), with all the circuitry under each pixel (e.g., complementary metal-oxide-semiconductor (CMOS) n-channel field-effect transistors (NFETs) and p-channel field-effect transistors (PFETs)) operating from the single supply voltage. This requires them to be built with high-voltage transistors, which are quite large. Typically, LCoS displays using pixel pitches of about 6 μm or larger are analog devices, which use a storage capacitor in each pixel to hold the pixel-electrode voltage over the frame-time.

These analog pixel circuits display gray-scale by writing the desired voltage to the storage capacitor. The amount of polarization change or phase shift is proportional to the voltage across the Liquid Crystal. Some analog pixel designs are much less desirable for a desired pixel pitch below about 6 μm, because the storage capacitor that is required to fit under pixels of that size is too small to hold enough charge for proper operation. In these known devices, transistor leakage causes the charge in the capacitor to "bleed" away during the frame, degrading the image.

LCoS designs with smaller pixel pitches have transitioned to the use of digital circuitry under the pixels. Typically, digital pixel circuitry uses data storage units, e.g., static random-access memory (SRAM) data storage, instead of capacitor data storage. Because SRAM storage of digital data is static, it does not suffer from leakage-caused degradation. FIG. 1 is a schematic of a conventional digital pixel circuit 100 having two SRAMs 102 and 104 that output to a pixel electrode 106. Known digital pixel circuits, such as the digital pixel circuit 100 provided in FIG. 1, have their drawbacks. For example, digital pixels can only take on two states: on or off (i.e., "1" or "0"). In order to portray a gray-scale image, digital pixels must rapidly alternate between "1" and "0" states with a duty-cycle or a pulse-width that takes advantage of the slow responding human eye, which averages the alternation between states and perceives gray-scale when the alternation between states is at a high enough rate. As a result, digital pixel circuits are required to drive the pixel electrodes to rapidly alternating high and low voltages during each frame. Another difficulty with conventional digital pixel circuits is that they are considerably more complicated than analog pixels. For example, a large number of transistors, typically in the range of 6-14 transistors, are required for each circuit under a pixel electrode in conventional digital pixel circuits.

SUMMARY

Embodiments of the present disclosure overcome the above-identified problems of conventional devices, systems, and methods, as well as other shortcomings and deficiencies of existing technologies, by providing an improved digital pixel circuit for Liquid Crystal displays (e.g., LCoS Displays and LCoS microdisplays). Embodiments herein incorporate a dual-voltage system and a level-shift system that enables a number of advantages including extremely small pixel pitch, which is suitable and desirable for various applications.

In an embodiment, a pixel circuit for supplying an output voltage to a pixel electrode in a display is provided. The pixel circuit includes a plurality of memory storage units; and a level shift circuit connected to at least one of the plurality of memory storage units, the level shift circuit adapted and configured to convert a core voltage to the output voltage supplied to the pixel electrode. The level shift circuit includes only two transistors, a first transistor and a second transistor. In an embodiment, a gate-voltage of the first transistor is controlled such that both an on-resistance and an off-resistance of the first transistor is lower than that of an off-resistance of the second transistor. In an embodiment, the first transistor is a PFET and the second transistor is a NFET. In an embodiment, a value of the core voltage is in the range of approximately 0.9V-1.2V, and a value of the output supply voltage is approximately 2-4V. In an embodiment, the plurality of memory storage units are static random-access memory units.

In an embodiment, the pixel circuit further includes an update circuit connected to the level shift circuit that toggles between a voltage $V_{REFON}$ and a voltage $V_{REFOFF}$. In an embodiment, the voltage $V_{REFON}$ and the voltage $V_{REFOFF}$ are analog voltages. In an embodiment, the voltage $V_{REFOFF}$ is selected to result in a higher subthreshold current of the first transistor relative to a leakage current of the second transistor. In an embodiment, the value of the subthreshold current of the first transistor is approximately 1 nA. In an embodiment, a value of the voltage $V_{REFOFF}$ is in a range between 0-0.4V less that the output supply voltage. In an embodiment, a value of the first voltage $V_{REFOFF}$ is selected below a turn-on threshold voltage of the first transistor. In an embodiment, the pixel circuit further includes a $V_{REFON}$ generation circuit for generating and calibrating the voltage $V_{REFON}$, and a $V_{REFOFF}$ generation circuit for generating and calibrating the voltage $V_{REFOFF}$. In an embodiment, each of the $V_{REFON}$ generation circuit and the $V_{REFOFF}$ generation circuit includes a plurality of level-shift circuits. The plurality of level-shift circuits may be located in a non-viewable portion of the display. In an embodiment, the $V_{REFON}$ generation circuit and the $V_{REFOFF}$ generation circuit are both analog circuits. In an embodiment, the $V_{REFON}$ generation circuit and the $V_{REFOFF}$ generation circuit are both digital circuits. In an embodiment, the display is a liquid crystal display. In an embodiment, the pixel circuit is provided on a silicon wafer. In an embodiment, a dimension of the pixel circuit is 1-6 μm.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

Embodiments of the devices, systems, and methods of the present disclosure include, but are not limited to: a dual-voltage pixel device or system; a two-transistor level-shift circuit device or system; a self-adjusting transistor bias circuitry that facilitates the successful use of the two-transistor level-shift circuit; and an on-chip "test-array" to determine die-specific design-center values for critical transistor leakage and threshold parameters. Level shift circuits and level shift circuit design simplicity, small pixel pitch, and applicability for small display applications, such as microdisplays, are among the various benefits and advantages obtained by the embodiments herein, as will be more fully described below.

Figure 1:
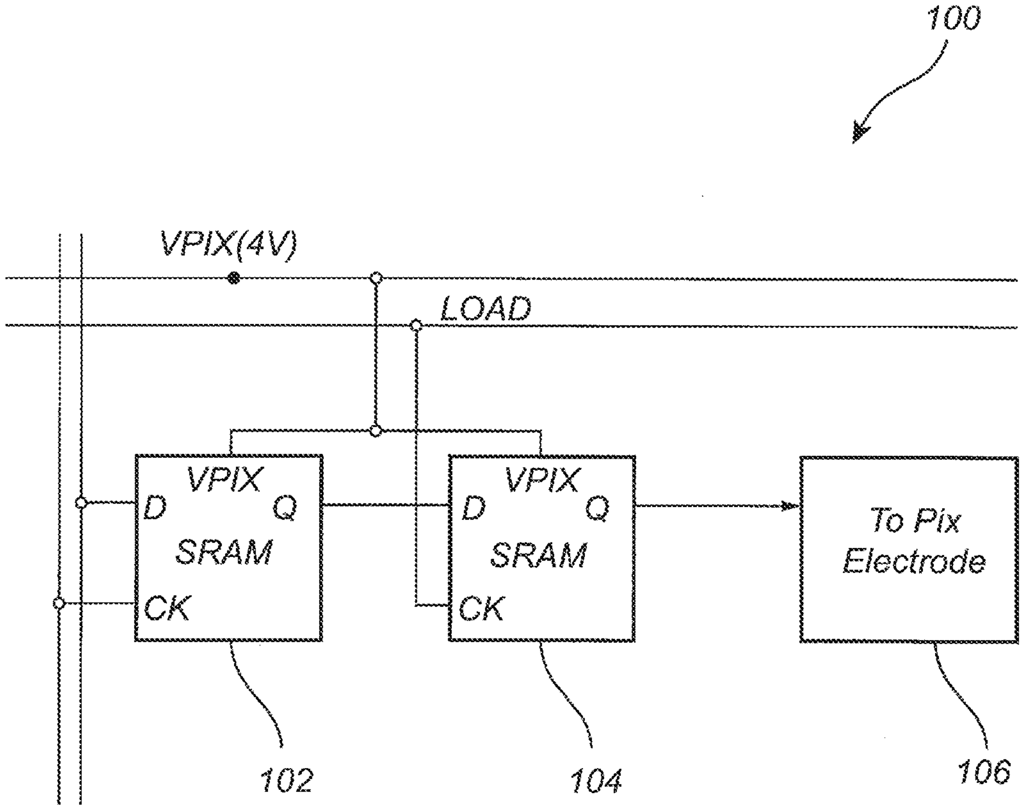
Fig. 1 (PRIOR ART)
FIG. 1 is a schematic of a conventional digital pixel circuit.
Figure 2:
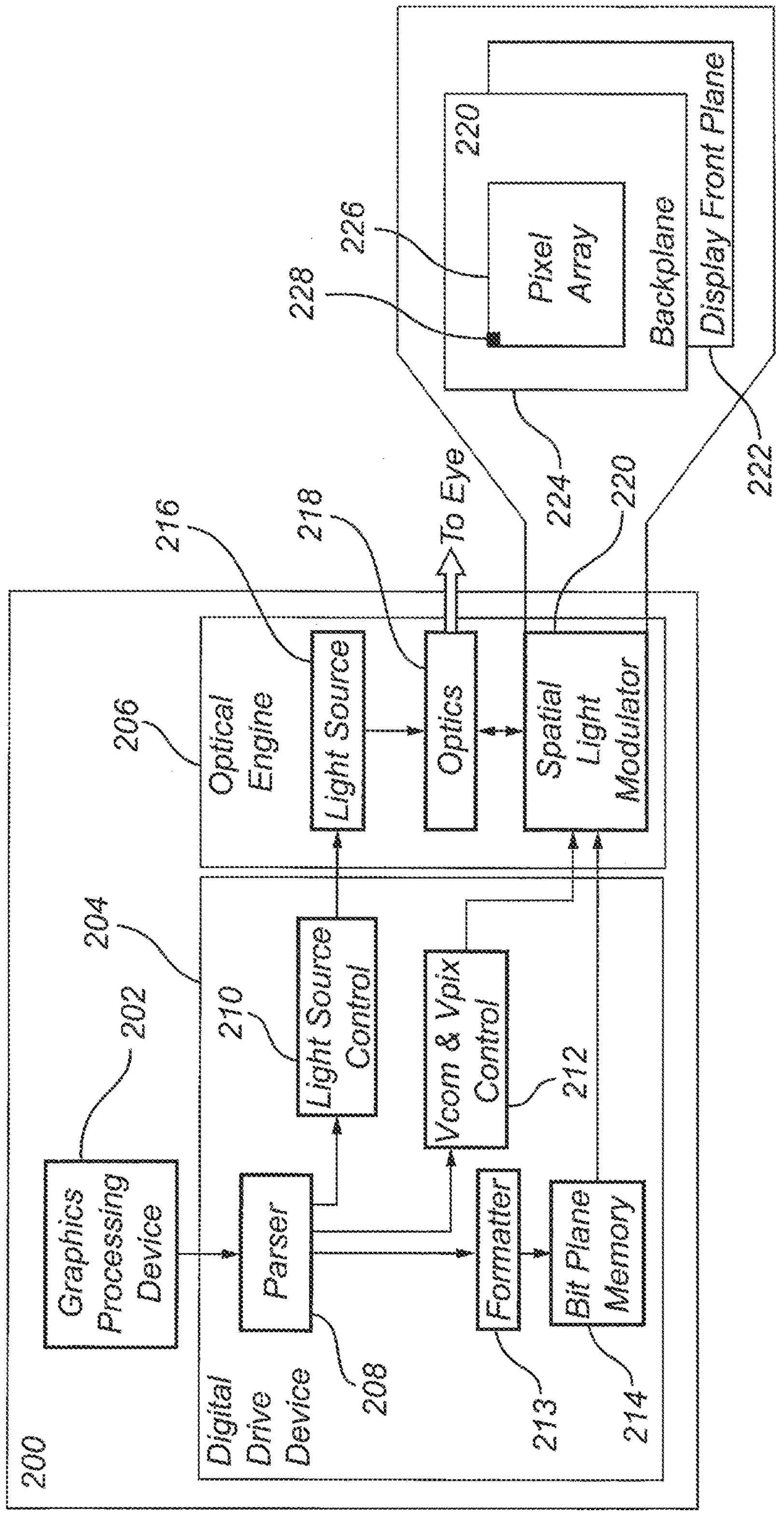
FIG. 2 is a schematic of a general display system in which the digital pixel circuit of the present disclosure is implemented in accordance with an embodiment of the present disclosure.

Referring to FIG. 2, a block diagram of a general embodiment of an LCoS display system 200 according to the present disclosure is provided by way of environmental context. As illustrated, the display system 200 includes a graphics processing device 202 coupled to a digital drive device 204, and an optical engine 206 coupled to the digital drive device 204. The graphics processing device 202 delivers image data and control commands to the digital drive device 204. The graphics processing device 202 generally includes a processor, or is associated with a processor, as well as other components known to those of ordinary skill in the art. The processor may be internal or external to the graphics processing device 202. In an embodiment of the present disclosure, the processor may execute software modules, programs, or instructions of the graphics processing device 202. A coupled memory block may also be internal or external to the graphics processing device 202.

The digital drive device 204 receives data from the graphics processing device 202, parses that data in Parser 208, and arranges the received data prior to communicating data, for example, image data, to the optical engine 206. The Parser 208 separates and/or identifies image and command data, and routes information (e.g., based on the received data) to Light Source Control 210, Formatter 213, and Vcom & Vpix Control 212 modules. Each of the Parser 208, Light Source Control 210, Formatter 213, and Vcom & Vpix Control 212 modules may be software and/or hardware modules.

The Light Source Control 210 converts received commands into timed control inputs. The Vcom & Vpix Control 212 converts received commands into voltages and the formatter 213 converts image data into a binary formatted data (for instance "Bit Planes") which are used to drive the state of the pixels in the display 220 after the Bit Planes have been stored in the Bit Plane Memory 214 (which is used as a staging area). The digital drive device 204 may be, for example, a component of a computing system, head mounted device, and/or other device utilizing an LCoS display.

In an embodiment of the present disclosure, the optical engine 206 contains the display 220 components and all other devices that may be required to complete the display system 200, as is well known to those of ordinary skill in the art. The Optical Engine 206 contains Light Source 216 which is controlled such that it illuminates Spatial Light Modulator 220 with intensity and on/off timing provided by Light Source Control 210.

The Spatial Light Modulator 220 contains the display Front Plane 222, for example, a liquid crystal (LC) cell, which modulates reflected or transmitted light under the influence of an electrical input from the underlying pixels (i.e., pixel electrode) 228 of the two-dimensional Pixel Array 226 which resides in the Backplane integrated circuit 224 (e.g., located or positioned within, coupled to and/or integrated into the Backplane integrated circuit 224). Pixels 228 in the backplane are coupled or electrically connected to the front plane and modulate the reflected light in accordance with the binary patterns provided from Bit Plane Memory 214.

Figure 3:
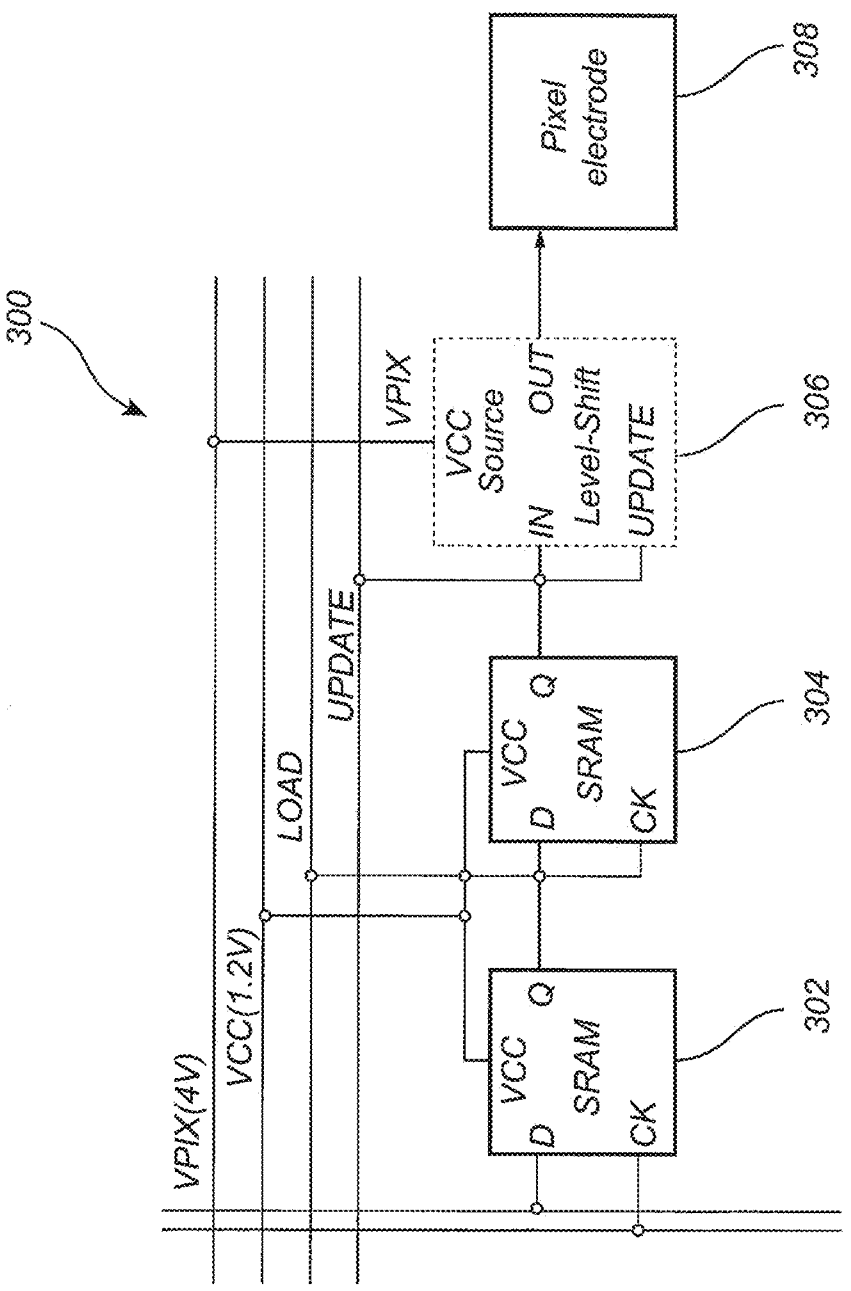
FIG. 3 is a schematic of a digital pixel circuit according to an embodiment of the present disclosure.

As described in subsequent figures, the pixel or pixel unit 228 includes or is integrated with or electrically coupled to memory elements 302 and 304 in FIG. 3 (e.g., SRAM elements) and Pixel Level Shifter 300 (FIG. 3) circuitry in accordance with the present invention. The memory elements of the pixel are loaded repeatedly from the binary patterns provided from the Bit Plane Memory 214 creating a time-dependent pixel state resulting in a gray-scale value (degree of illumination) at each pixel. The Pixel Level Shifter 300 serves to translate lower-voltage signals from the memory elements to the higher voltages required to perform electro-optic modulation in the Front plane 222. As will be described subsequently, incorporation of the level shifter, the supporting bias and control circuitry and their novel design all serve to reduce the operating voltage and size of the pixel, while also increasing its speed of operation, both of which are highly desirable for microdisplay systems.

The Optics 218 within the Optical Engine 206, may contain beam splitters, polarizers (or polarizing beam splitters), lenses and waveguides and serves to route the light from the light source 216 to the spatial light modulator 220 and then pass the resulting modulated image to the user's eye.

Dual Voltage Digital Pixel with Level-Shift Circuitry

In an embodiment, a pixel circuit operating at two different voltages is provided. One portion of the circuitry in the pixel circuit, remote from the output of the pixel circuit, operates at a low voltage. This first, low voltage corresponds to the "core voltage" of the wafer fabrication process for the pixel circuitry manufactured according to embodiments of the present disclosure. As is understood by those skilled in the art, the dimensions of the gate oxide in the transistors in a given fabrication process determine the maximum voltage at which operation can be carried out without becoming unreliable. In an embodiment, the low voltage is in a range at or between about 0.9V-1.2V, depending on the selected process node. The second, relatively higher voltage is used just at the output of the pixel circuit. In an embodiment, the second/higher voltage is about 4V. According to an embodiment, a Level-Shift circuit or Level-Shift block is provided to translate the low voltage of the pixel circuit logic up to a high voltage needed for a desired pixel circuit output. Because the low-voltage core transistors are much smaller than the high-voltage transistors needed for the output, more of them can fit in the available space. In an embodiment, the low-voltage core transistors are approximately one quarter of the size of the high-voltage transistors, depending on the process node and the difference in operating voltage of the low-voltage and high-voltage transistors.

A schematic of a pixel circuit 300 according to an embodiment of the present disclosure is shown in FIG. 3. This pixel circuit 300 resides in the optical engine 206 of FIG. 2. In this embodiment, the digital pixel circuit 300 includes two data storage units, SRAM 302 and SRAM 304. The SRAM units 302 and 304 operate at a core voltage, VCC. In an embodiment, VCC is at or about 0.9-1.2V. The SRAM units 302 and 304 incorporate much smaller (4-10 times smaller in length and 8-20 times smaller in area) low-voltage "core" transistors, relative to conventional designs. (Relevant conventional designs typically operate the SRAM parts of a pixel at the common power supply voltage, $V_{PIX}$, which requires them to be built with high-voltage transistors that are quite large (4-10 times larger in length and 8-20 times larger in area).) The pixel circuit 300 also includes a level shifting circuit, namely a Level-Shift block 306. The Level-Shift block 306 operates at a supply voltage, $V_{PIX}$, and includes the following terminals: $V_{PIX}$, IN, OUT and UPDATE, as illustrated. The $V_{PIX}$ terminal is connected to $V_{PIX}$, the IN terminal is connected to the SRAM 304, the UPDATE terminal is connected to the UPDATE input line, and the OUTPUT is connected to the pixel electrode 308. In an embodiment, supply voltage $V_{PIX}$ is at or about 4V. The LOAD input is used to update a latch within the SRAM 304 at a particular point in time, which is desirable in many applications. The UPDATE input is utilized for operation of the Level-Shift block 306 and is described in greater detail below.

Figure 4:
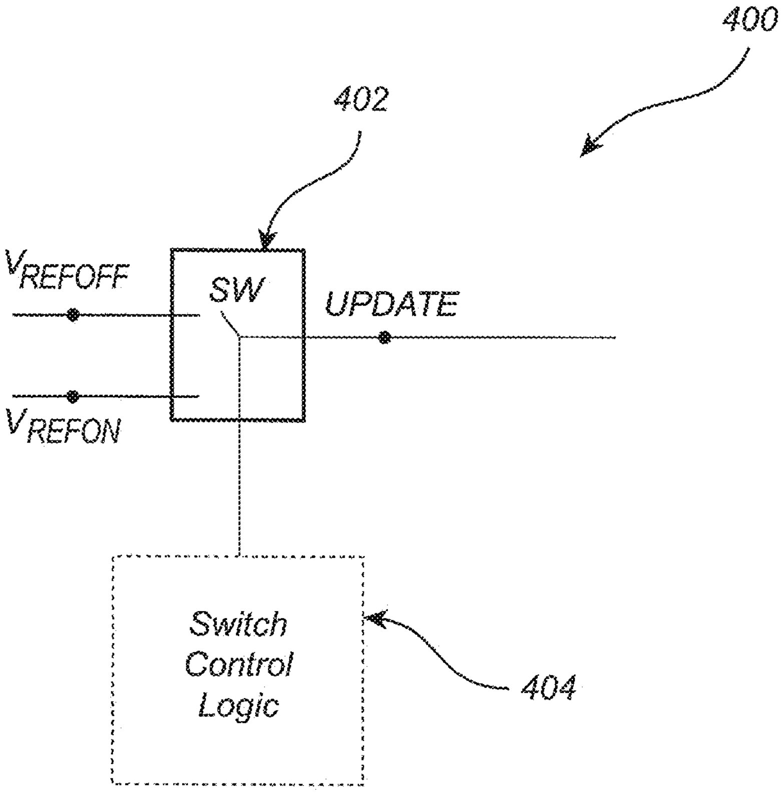
FIG. 4 is a schematic of the UPDATE logic that is connected to the UPDATE input provided in FIG. 3.

FIG. 4 is a schematic of the UPDATE circuit 400 connected to the UPDATE input provided in FIG. 3. The UPDATE circuit 400 includes a switch 402 that is operated by control logic 404 that alternates the switch 402 between $V_{REFOFF}$ and $V_{REFON}$. The control logic 404 connects to $V_{REFON}$ for a time interval (e.g., 100 ns) at the end of each bit sequence. In a display according to the embodiments herein, there are multiple copies of the UPDATE circuit 400, and each UPDATE circuit 400 is connected to a corresponding Level-Shift block 306 (FIG. 3) for each group of columns within a pixel array.

One of the benefits and advantages of the embodiments of the present disclosure is that a pixel array according to embodiments herein is divided into groupings of pixels, for example, into 32 groups of about 64 columns each, and an UPDATE driver is assigned to each group of columns. This division reduces the load on each UPDATE driver, for example, to only about 132,000 level-shift UPDATE inputs. An additional benefit of having multiple UPDATE circuits 400, in accordance with the present disclosure, is that a single UPDATE circuit 400 serves a portion of a display (i.e., a group of pixels), rather than the entire display. For example, an UPDATE circuit 400, in accordance with the present disclosure, serves a particular group of pixels (e.g., at least one group of pixels out of 32 groups of pixels). In an embodiment of the present disclosure, whenever there is an UPDATE event (i.e., an event corresponding to a need to update one or more pixels), each of the Level-Shift blocks 306 pulls a short-term (e.g., <Ins) current surge from their $V_{PIX}$ pin (i.e., in an embodiment of the present disclosure, this functionality may be incorporated into a semiconductor chip having pins, and the output of one of the pins of the semiconductor chip corresponds to $V_{PIX}$). In an embodiment, each of the UPDATE inputs, for example, the 32 UPDATE inputs that drive the groups of columns is delayed relative to the previous UPDATE input by approximately 3-50 nanoseconds using an on-chip shift-register, rather than having for example, 2.2 million pixel level-shifters UPDATE at the same instant in time. As a result, the total current surge is spread out, which reduces the peak value and avoids circuit malfunction that would otherwise be caused by the current surge.

Figure 5:
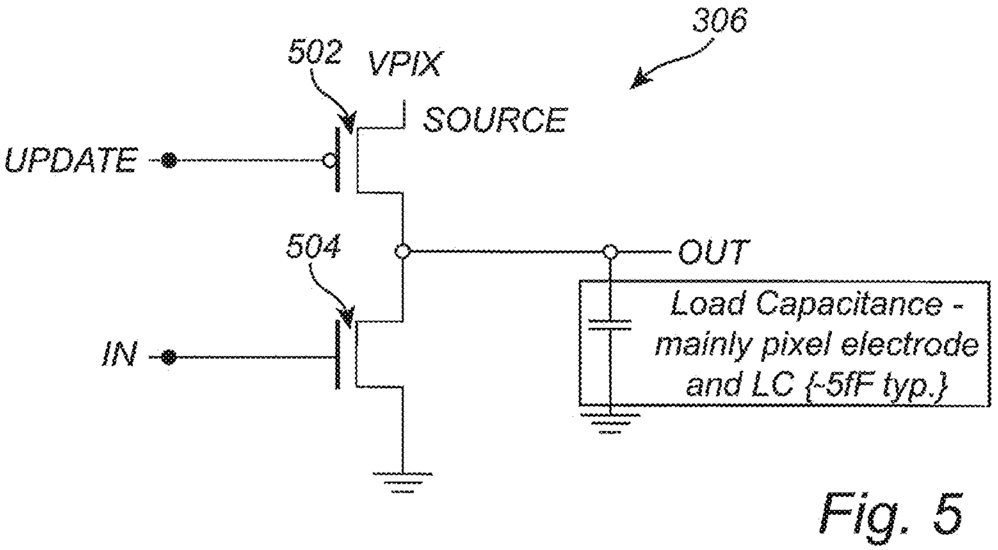
FIG. 5 is a schematic of the Level-Shift block used in the pixel circuitry according to an embodiment of the present disclosure.

FIG. 5 shows an exemplary schematic of the Level-Shift block. 306 (FIG. 3) used in the digital pixel circuit 300 (FIG. 3) of an embodiment of the present disclosure. In an embodiment, the Level-Shift block 306 only requires two high-voltage transistors (e.g., field-effect transistors (FETs), PFETs, or NFETs), namely, a first transistor 502 (e.g., a PFET), and a second transistor 504 (e.g., a NFET). (As noted above, the embodiments of the present disclosure are in contrast with conventional digital systems, which typically require eight or more high-voltage transistors, increasing the size of conventional pixel circuits.) The Level-Shift block 306 includes an UPDATE input, which is used to modulate the first transistor 502. The transistors 502 and 504 of the Level-Shift block 306 are connected to the power supply voltage $V_{PIX}$ of the pixel circuit 300. In an embodiment, VCC (i.e., the power supply voltage) is at or between approximately 0.9V and 1.2V. It would be understood by one of ordinary skill in the art that the value of VCC may vary based on the specific wafer fabrication process being used. In an embodiment, $V_{PIX}$ is higher than VCC. In an embodiment, $V_{PIX}$ does not exceed approximately 4V.

Figure 6:
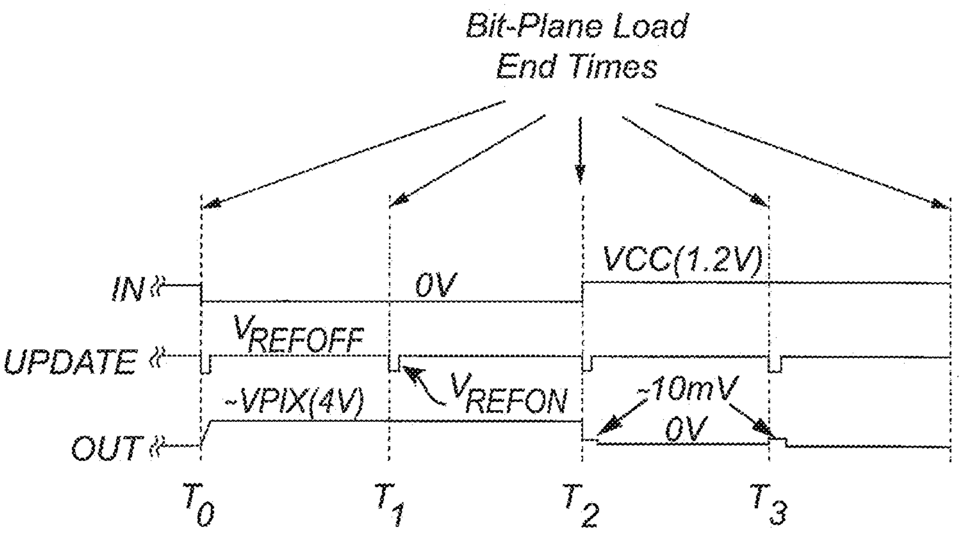
FIG. 6 shows Level-Shift input and output waveforms for both high and low Level-Shift inputs, along with the corresponding UPDATE waveform according to an embodiment of the present disclosure.

FIG. 6 illustrates an INPUT terminal for receiving a waveform and an OUTPUT terminal that outputs the waveform of the Level-Shift block 306 (FIGS. 3 and 5), according to an embodiment of the present disclosure. An embodiment of a corresponding UPDATE waveform of the Level Shift block 306 is also shown. The UPDATE input is an analog input that toggles between two preselected analog voltages, $V_{REFOFF}$ and $V_{REFON}$. The $V_{REFOFF}$ voltage, which is the normal "resting level" of the UPDATE input, is a carefully selected and calibrated voltage slightly below the turn-on threshold of the first transistor 502 of FIG. 5. For example, a practical range of currents in the PMOS device for $V_{REFOFF}$ is typically 4-10 times the "off" current of the NMOS device ($V_{gs}$-0V). $V_{REFOFF}$ is selected to result in a subthreshold current of the transistor 502 of a few times higher than the normal leakage current of the second transistor 504 (FIG. 5). In an embodiment, the value of the subthreshold current of the transistor 502 is 1 nA, a $V_{PIX}$ voltage is 4V, a nominal threshold voltage for transistor 502 is about −0.4V or −0.6V, depending on process and temperature, and $V_{REFOFF}$ is approximately at or between 3.7V and 3.8V. It should be noted that Vgs may be 0V or otherwise controlled to track the behavior of one or both transistors for robust operation. In an embodiment, $V_{REFOFF}$ is selected to a predetermined value that will result in an on-current of the transistor 502 that is higher than the leakage current of the transistor 504. As a result, whenever the transistor 504 is biased off and the UPDATE input is at $V_{REFOFF}$, the resistance of the transistor 502 will be lower than the resistance of the transistor 504, and the OUT terminal voltage of the Level-Shift block 306 will stay at approximately $V_{PIX}$.

The UPDATE input is pulsed and is carefully selected and calibrated so that it is close to the threshold of the transistor 502. Because $V_{REFON}$ is selected in this manner, it turns on the transistor 502. In an embodiment, this $V_{REFON}$ is chosen to result in a current of at or approximately 1 μA (0.5-4 μA), at a $V_{DS}$ of at or approximately 2-4V. ($V_{DS}$ is the voltage between the drain and source pins of the transistor 502). In an embodiment, $V_{PIX}$ is 2-4V, and $V_{REFON}$ is at or approximately 3.4V-3.5V, or 0.6-0.6V below $V_{PIX}$. Control logic 404 shown in FIG. 4 in the display (not shown) drives the UPDATE input and causes it to pulse to the $V_{REFON}$ voltage for a short time (e.g., 100 ns) right after each bit-plane is loaded. The bit-plane is loaded whenever a new value is loaded into the SRAM 304 of FIG. 3.

In an embodiment, the Level-Shift block 306 operates as follows: at time $T_0$, a bit-plane load ends and the OUT terminal of the Level-Shift block 306 remains at 0V. Thus, at $T_0$, the IN terminal of the Level-Shift block 306 becomes 0V, indicating that a low or "0" was loaded into the output SRAM 304 of the pixel circuit 300. This sets the $V_{GS}$ of the transistor 504 to 0V, turning it off. ($V_{GS}$ is the voltage between the gate and source terminals of the transistor 504—in FIG. 5, for the transistor 504, the gate is the terminal that "IN" is connected to, and source is the terminal that is connected to ground, the other terminal of transistor 504 is the drain, since the source is at ground and the gate is also at ground, the difference ($V_{GS}$) is 0V.) At the same time, the UPDATE input switches to the $V_{REFON}$ voltage, turning on transistor 502. This charges up the OUT terminal of the Level-Shift block 306, which is driving only a small amount of capacitance, typically about 5 fF, at the pixel electrode 308 (FIG. 3), as can be seen in FIG. 6. Since the $V_{PIX}$ terminal of the transistor 502, in the Level-Shift block 306, is connected to $V_{PIX}$, the voltage at the OUT terminal of the Level-Shift block 306 becomes approximately the same voltage as $V_{PIX}$. After a short time, typically about 10-100 ns, the pulse on the UPDATE input ends, shortly after $T_0$. The OUT terminal value of the Level-Shift block 306 remains at approximately $V_{PIX}$, due to the charge-storage of the capacitance of the pixel electrode 308. (Note, the on-resistance of the transistor 502 is selected to be lower than the off-resistance of the transistor 504.)

Another bit-plane load ends at time $T_1$, again with a "0" loaded into the output of SRAM 304. Since the transistor 504 was already off, and the OUT terminal of the Level-Shift block 306 was already at $V_{PIX}$, the OUT terminal remains at $V_{PIX}$. At time $T_2$, another bit-plane load ends, with a "1" loaded into the output of the SRAM 304. This fully turns on the transistor 504. At time $T_2$, the UPDATE input switches to $V_{REFON}$, and turns on the transistor 502. The on-resistance of the saturated transistor 504 is significantly lower (10-100×) than that of the turned-on transistor 502. The OUT terminal voltage of Level-Shift block 306 only shifts above ground by a few millivolts, as can be seen in FIG. 6. As soon as the pulse on the UPDATE input ends, the transistor 502 returns to its subthreshold bias condition, and the OUT terminal voltage drops back to the 0V ground level. At time $T_3$, another bit-plane load ends, again with a "1" loaded into the OUT terminal of SRAM 304. At the same time, the UPDATE input switches to $V_{REFON}$, as at $T_2$. Because the transistor 504 remains on, there is only a temporary voltage increase of a few mV (~0.5-5 mV) at the OUT terminal of the Level-Shift block 306. One of the benefits and advantages of the Level-Shift block 306 of FIG. 5 is that only two transistors are required to shift the voltage. The small number of transistors results in small enough circuity to fit within the pixel.

Voltage Generation Circuitry

Figure 7A:
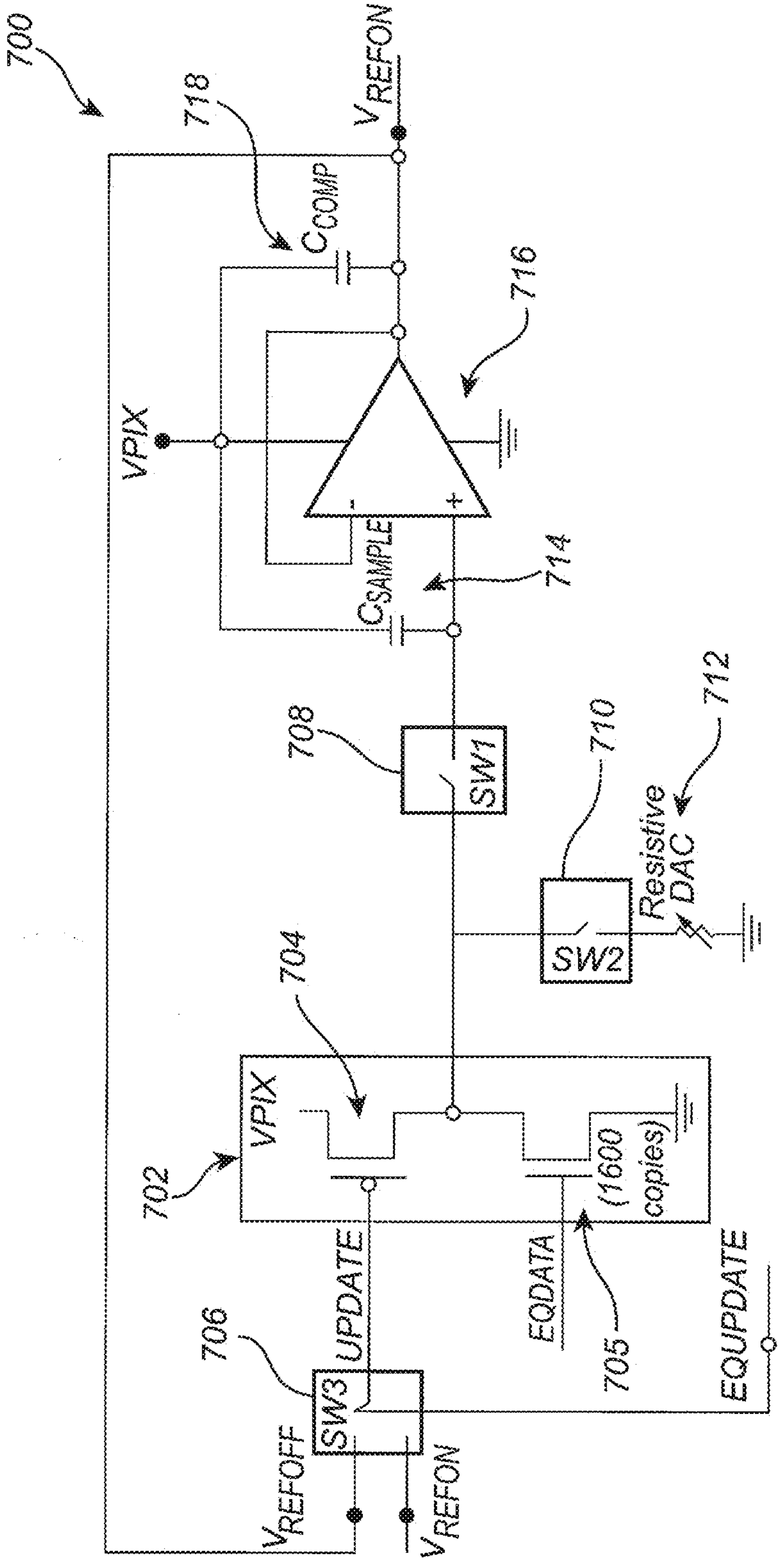
FIG. 7A is a schematic of an analog implementation of the $V_{REFON}$ generation circuit according to an embodiment of the present disclosure.
Figure 7B:
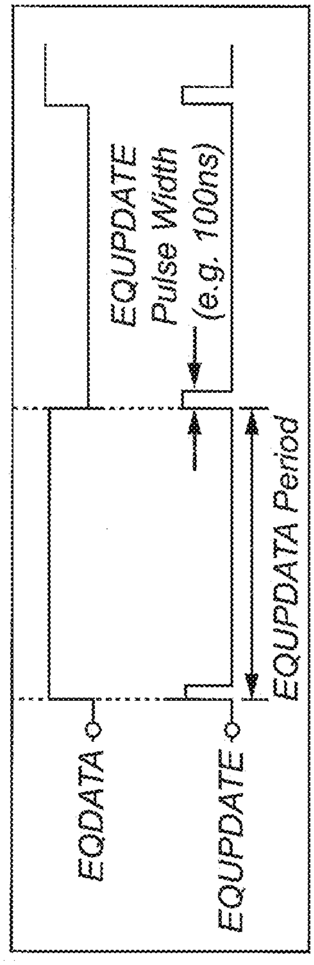
FIG. 7B shows the corresponding waveforms of FIG. 7A according to an embodiment of the present disclosure.
Figure 8A:
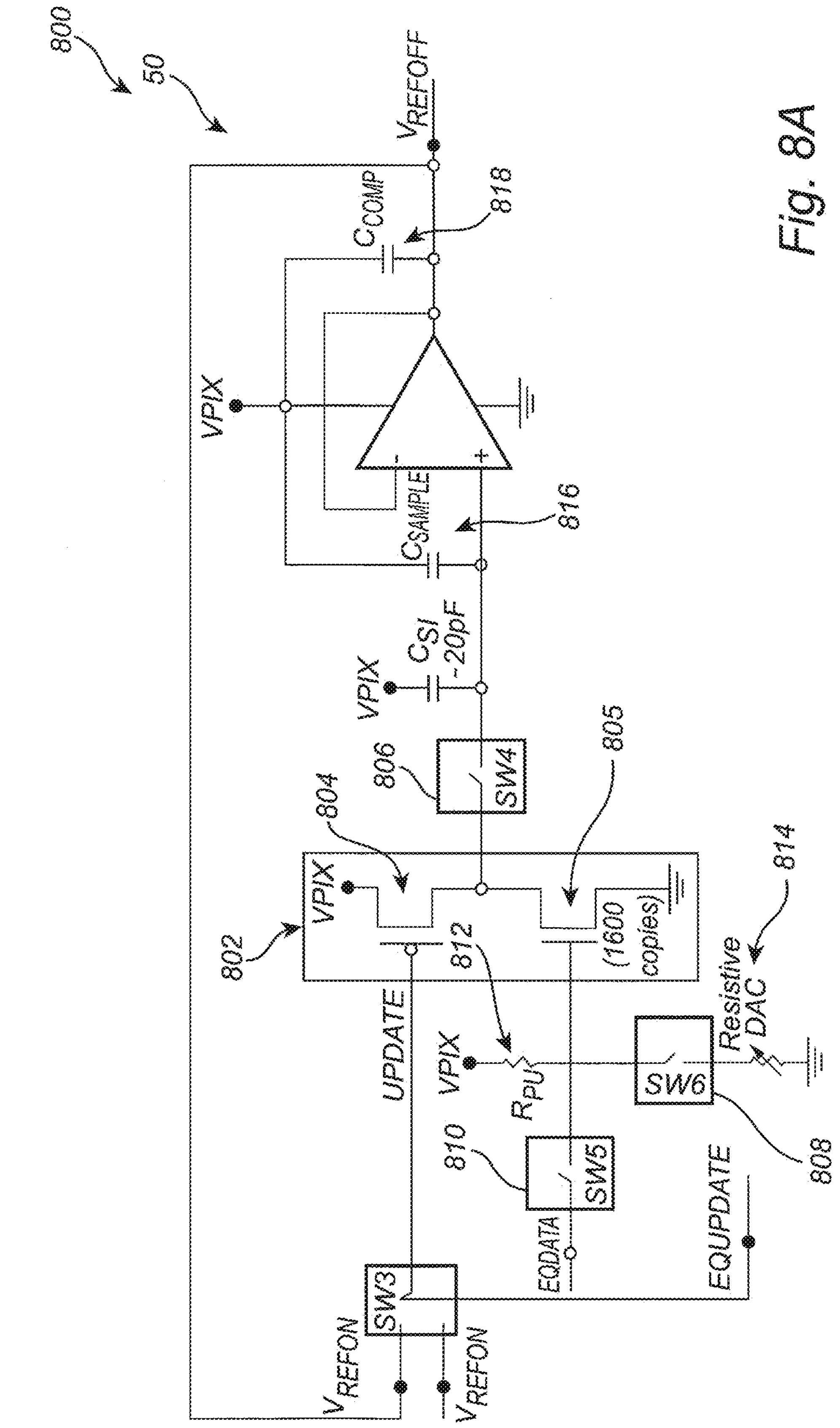
FIG. 8A is a schematic of an analog implementation of the $V_{REFOFF}$ generation circuit according to an embodiment of the present disclosure.
Figure 8B:
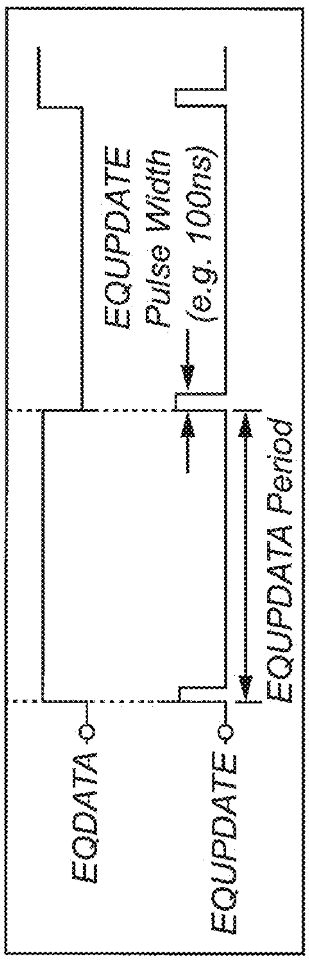
FIG. 8B shows the corresponding waveforms of FIG. 8A according to an embodiment of the present disclosure.

Operation of the pixel circuit 300 (FIG. 3) depends on the selection of the levels of $V_{REFON}$ and $V_{REFOFF}$. Thus, embodiments of the present disclosure include circuitry that generates the $V_{REFON}$ and $V_{REFOFF}$ voltages in a manner that reduces errors between transistors on a given wafer substrate for microelectronic devices built in and upon a wafer manufactured according to embodiments of the present disclosure. This, in accordance with the present disclosure, creates voltages based on measured and scaled values derived from identical transistors in each display die FIGS. 7A and 8A are exemplary embodiments, in accordance with the disclosure, of an analog $V_{REFON}$ and $V_{REFOFF}$ generation circuit, respectively. FIGS. 7B and 8B illustrate embodiments of the corresponding waveforms of the EQDATA and EQUPDATE of each of the generation circuits 700 and 800 provided in FIGS. 7A and 8A, respectively. Both the $V_{REFON}$ generation circuit 700 and the $V_{REFOFF}$ generation circuit 800 may make use of a "test-array" 702 and 802. In an embodiment, the test-array 702 or 802 is in a non-viewable portion of a display. The test-array 702 or 802 contains a plurality of copies of Level-Shift blocks or circuits identical to the Level-Shift block 306 (FIGS. 3 and 5) (e.g., 1600 copies) that are not associated with any pixels. Each copy is connected in parallel such that the $V_{PIX}$, GROUND, IN, OUT, and UPDATE terminals of each one of the Level-Shift blocks 306 of the test-array 702 or 802 are connected to the same terminals of all the others. (Note, the "UPDATE" input from all these Level-Shift blocks 306 does not connect to the "UPDATE" inputs of the circuits in the pixel array). The test-array 702 or 802 averages the characteristics, such as the threshold voltages and the on-resistances of the transistors, of all the Level-Shift blocks 306 in the test-array 702 or 802 and provides a reference for the $V_{REFON}$ and $V_{REFOFF}$ generation circuits 700 and 800 that tracks these characteristics. One of the benefits and advantages of the test-array 702 or 802 is tracking the "aging" of the high-voltage transistors (e.g., the transistors 704, 705, 804, and 805) over time, so that, as the characteristics of these transistors 704, 705, 804, and 805 change, the $V_{REFON}$ and $V_{REFOFF}$ voltages change accordingly.

An embodiment of the $V_{REFON}$ generation circuit 700 operates according to the following steps. First, logic located on-chip generates an "EQDATA" input and an "EQUPDATE" input. The EQDATA input corresponds to a data waveform that is presented to a pixel Level-Shift block 306. Because of the normal inversions applied to Liquid Crystal (LC) displays in normal operation, in an embodiment, the waveform is a 50% high square-wave with a half-period of just under or approximately 174 μs (e.g., 173.61 μs). Synchronized with this is an EQUPDATE input. In an embodiment, the EQUPDATE input pulses high for 100 ns out of every EQDATA input half-cycle and represents exemplary UPDATE cycles presented to the pixel Level-Shift blocks 306. As illustrated in FIG. 7A, switch SW3 706 is controlled by the EQUPDATE input. Switch SW3 706 is normally in the position shown, with the gates of the transistor 704 (e.g., a PFET) in the test-array 702 connected to $V_{REFOFF}$. In an embodiment, when the EQUPDATE input pulses high, the gates of the transistor 704 are connected to $V_{REFON}$ for 100 ns. As illustrated in FIG. 7B, half of the time when EQUPDATE pulses high EQDATA is low. Logic causes switch SW1 708 and switch SW2 710 to close during these times. During the 100 ns of the EQUPDATE input pulse, for example, the transistors 704 are biased slightly on based on the $V_{REFON}$ voltage from switch SW3 706. Since the EQDATA input is low, the transistors 705 of the test-array 702 are off. So, the total output current (at a transistor GATE voltage of $V_{REFOFF}$) of the copies of the transistor 704 (e.g., 1600 copies) in the test-array 702 flows through the Resistive DAC 712 (e.g., a 4-bit Resistive DAC), causing a voltage drop across it proportional to the on-current of these copies of the transistor 704 (e.g., 1600 copies). This voltage drop is stored on capacitor $C_{SAMPLE1}$ 714 and buffered by the Op-Amp 716 to create the $V_{REFON}$ voltage. Because the gate to drain characteristic of the transistor 704 is effectively inverting, a negative feedback loop is formed. Capacitor $C_{COMP1}$ 718 is a compensation capacitor that keeps the sampling loop stable. The action of switches SW1 708 and SW2 710 ensure that the voltage on capacitor $C_{SAMPLE1}$ 714 is only updated when the EQDATA and EQUPDATE inputs are in the correct polarity. The net effect of this sampling loop is that the $V_{REFON}$ voltage and thus the on-current of the test-array transistors 704 is set by the value programmed into the Resistive DAC 712 and by the threshold voltage of the transistors 704 in that particular die. If the threshold voltage of the transistors 704 was to change (e.g., changes caused by a device aging), the action of the feedback loop would be to correct the $V_{REFON}$ voltage to get approximately the same transistor current as before.

In an embodiment, the Resistive DAC 712 is controlled by a register setting in the display. Default values for this register may be chosen to result in an on-current value for test-array transistor 704 (e.g., approximately 1 μA per transistor), and the inclusion of the test-array 702 in the feedback loop guarantees that this value will be achieved even over process variations and even with threshold variations as can be expected due to aging of the transistor 704.

FIG. 8A is a diagram of an exemplary embodiment of the $V_{REFOFF}$ generation circuit 800. The operation of the $V_{REFOFF}$ generation circuit 800 is as follows. First, the test-array transistor 804 gate is driven the same as for the $V_{REFON}$ generation circuit 700 (FIG. 7A). When both EQDATA and EQUPDATE inputs are low, a pixel Level-Shift 306 (FIGS. 3 and 5) connected to these voltages would be in the "maintain" state. In this embodiment of $V_{REFOFF}$ generation circuit 800, switch SW4 806 and switch SW6 808 are closed when the EQDATA and EQUPDATE inputs are low. And, switch SW5 810 is closed when EQDATA or EQUPDATE is high. A resistor network, consisting of resistor $R_{PU}$ 812 and Resistive DAC 814 (e.g., a 4-bit Resistive DAC), sets an above-ground bias voltage on the gate of the test-array transistors 805. This increases the current in the transistors 805 to some value above the leakage current, for example, some multiple of the leakage current in the transistors 805. The action of the feedback loop increases the current in the transistors 804 to match this value. Thus, adjusting the Resistive DAC 814 allows the off current in the transistors 804 to be controlled to a value enough higher than the transistors leakage current to make sure that the Level-Shift blocks output (for Level-Shift blocks 306 controlled by these $V_{REFON}$ and $V_{REFOFF}$ voltages) will stay in the high state. Again, one of the advantages of embodiments of this generation circuit 800 is that it self-adjusts for process variations and transistor aging. As with the VREFON circuit 700, there is a sampling capacitor $C_{SAMPLE2}$ 816 and a compensation capacitor $C_{COMP2}$ 818 to keep the circuit 800 stable.

The adjustments for the two Resistive DACs 712 and 814 account for the process variability for leakage currents and threshold voltages for these high-voltage transistors. The $V_{REFOFF}$ Resistive DAC 814 (and therefore the transistor off-current) needs to be adjusted to a value that guarantees that this off-current is higher than any expected transistors leakage current to 5 or 6-sigma limits. In an embodiment, the $V_{REFON}$ Restive DAC 712 (and therefore the transistor on-current) needs to be adjusted to a value that will result in approximately 1 μA of pull-up current over the expected range of the transistor threshold voltages (e.g., again to 5 or 6-sigma limits). Because the transistors 704, 705, 804, and 805 in the test-array 702 and 802 are comparable to those in the actual pixel level-shifters 306, making these adjustments to the $V_{REFON}$ and $V_{REFOFF}$ circuits 700 and 800 will result in the same on and off currents for the actual pixel level-shifters 306 that are connected (via the UPDATE input) to these same $V_{REFON}$ and $V_{REFOFF}$ levels.

Figure 9:
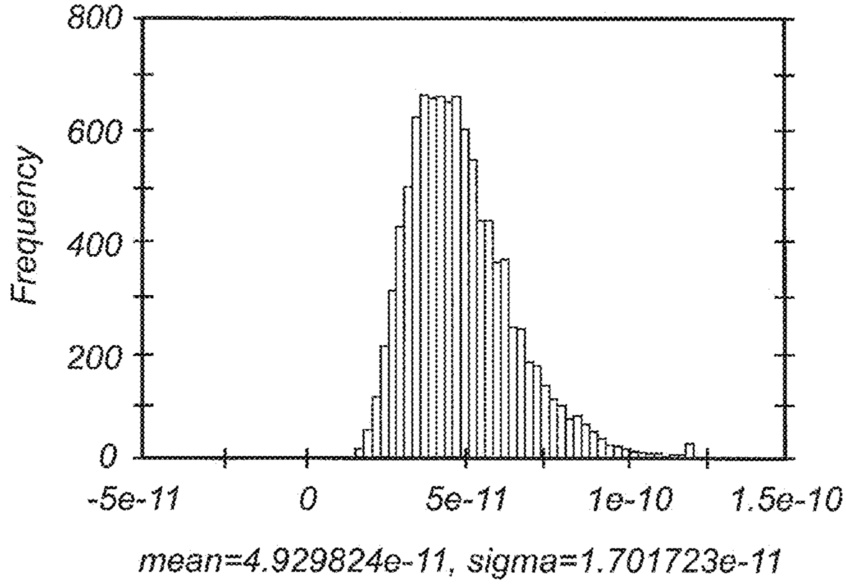
FIG. 9 shows an example histogram for the high-voltage transistor (e.g., NFET) Off-current (i.e., leakage current) for an exemplary process according to an embodiment of the present disclosure.
Figure 10:
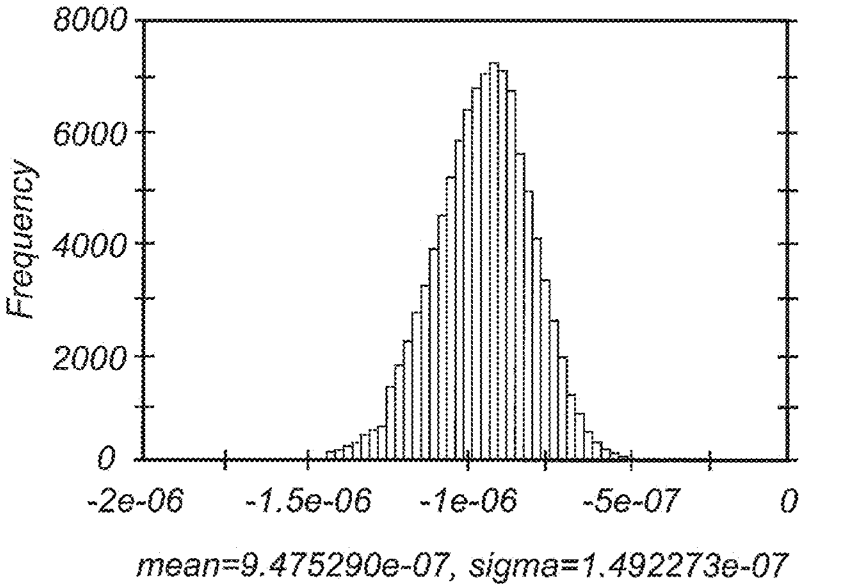
FIG. 10 shows an example histogram for the high-voltage transistor (e.g., PFET) threshold voltage for an exemplary process according to an embodiment of the present disclosure.

FIG. 9 shows an example embodiment of a histogram for the transistors off/leakage-current. FIG. 10 shows an example embodiment of a histogram for the transistor on-current at a fixed gate voltage of VCC-0.585. The variation indicates a distribution of threshold voltages. The actively compensated $V_{REFON}$, as provided by the $V_{REFON}$ generation circuit 700 (FIG. 7), for example, compensates for the variance of the on-current (e.g., 0.5 μA to 1.5 μA).

The same $V_{REFON}$ and $V_{REFOFF}$ voltages may be used as the two levels for the UPDATE input to the actual pixel array. In an embodiment of the disclosure, the high-voltage transistors in the pixel array track the transistors in the test-array 702 (FIG. 7) and 802 (FIG. 8), and accomplish the objective of keeping the on-current and off-current of the Level-Shift block 306 (FIGS. 3 and 5) controlled to values that guarantee operation over a range of processes, avoiding excessive power dissipation.

The $V_{REFON}$ and $V_{REFOFF}$ generation circuits 700 (FIG. 7) and 800 (FIG. 8) are only exemplary implementations. The present disclosure contemplates other embodiments that provide similar results. For example, in an embodiment of the present disclosure, a digital implementation of a generation circuit may include a circuit/circuitry in which the currents in the test array are measured by an Analog-to-Digital converter, adjusted by digital circuitry, and converted to the $V_{REFON}$ and $V_{REFOFF}$ voltages by one or more Digital-to-Analog (DAC) converters. The embodiments of the disclosure should thus not be considered as being limited to any particular $V_{REFON}$ or $V_{REFOFF}$ generation circuit implementation.

Figure 11:
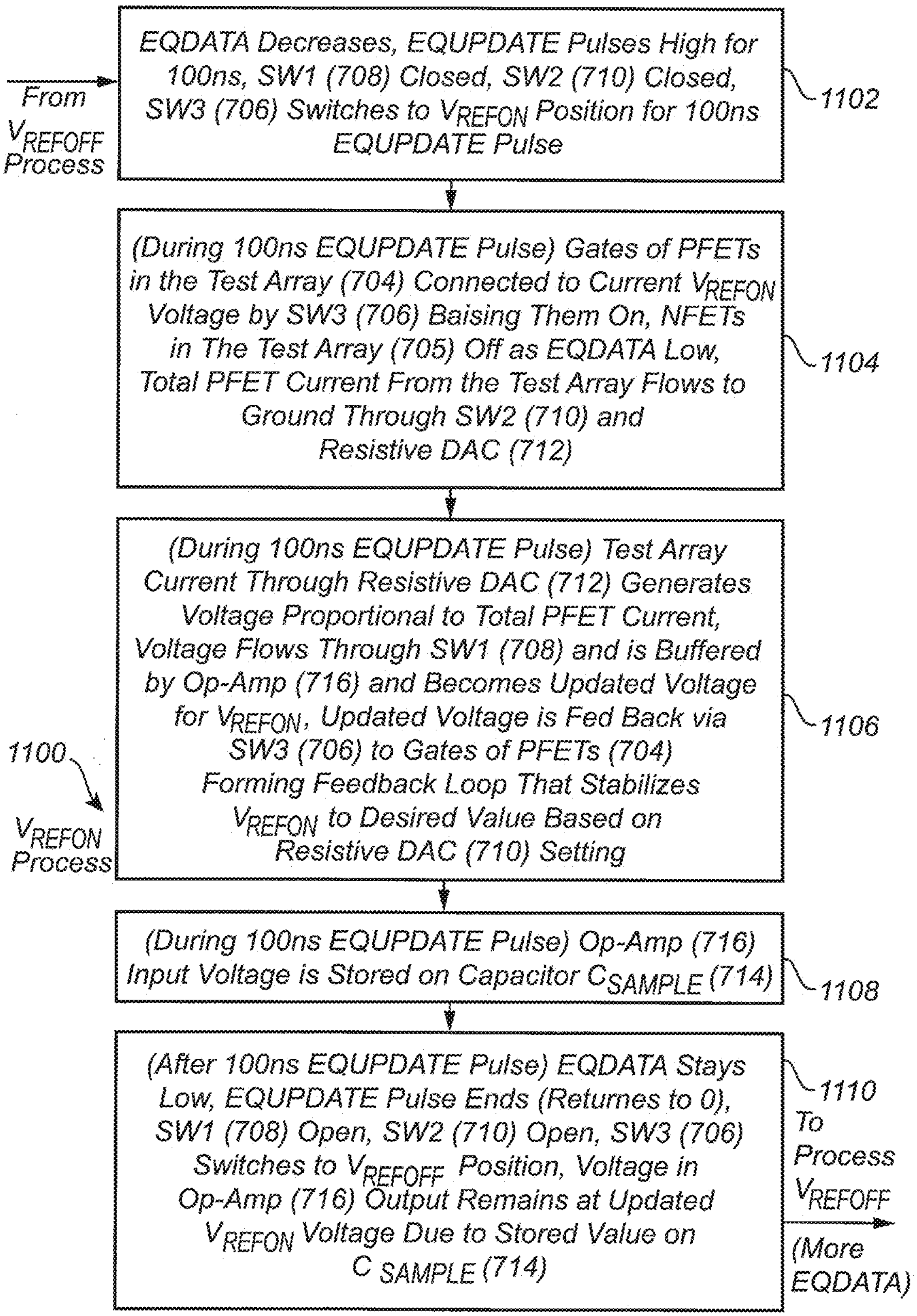
FIG. 11 is a flowchart illustrating the operation of the $V_{REFON}$ process of a display, such as that of FIGS. 6, 7A, 7B, 8A, and 8B, according to an embodiment of the present disclosure.
Figure 12:
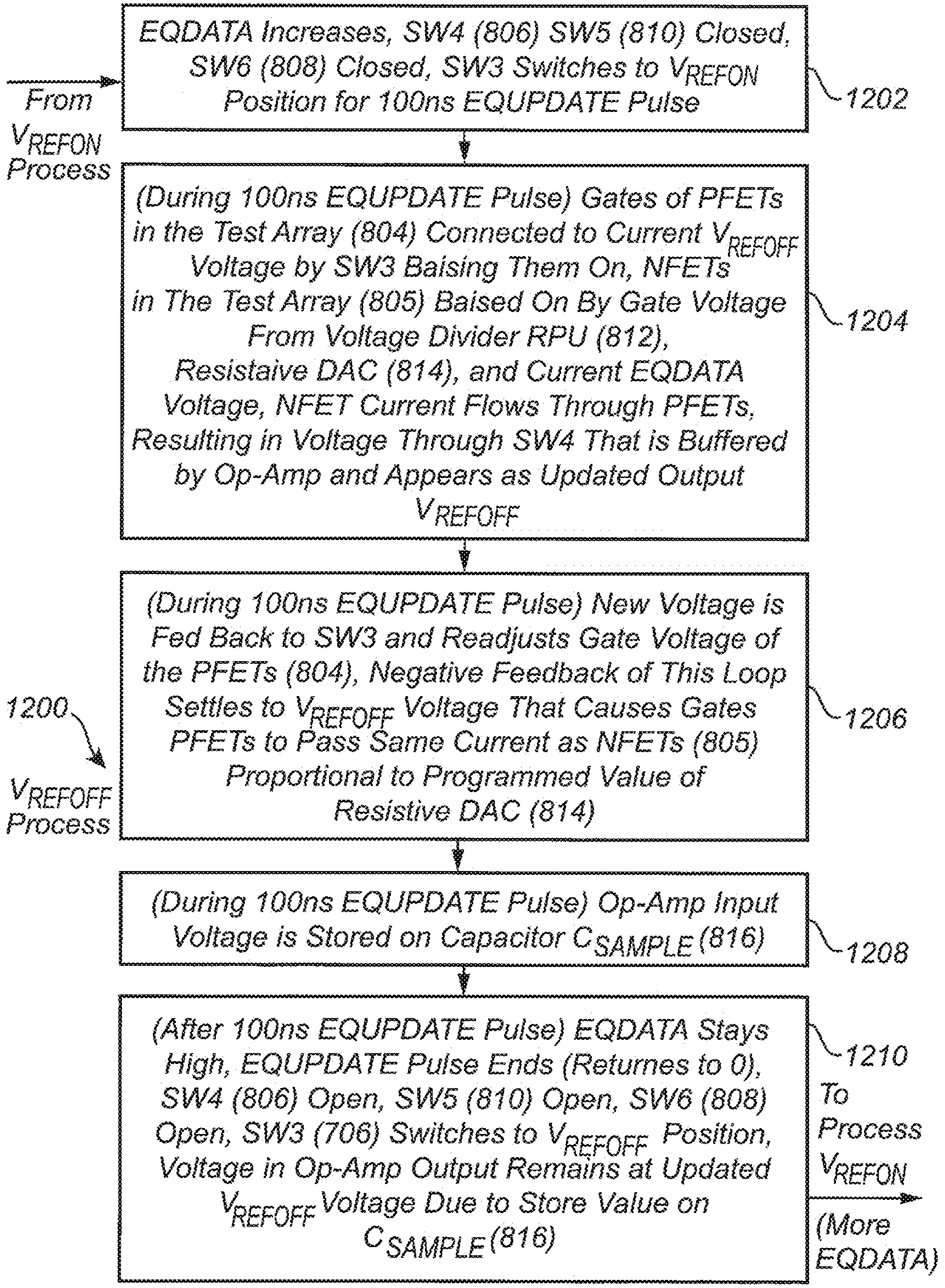
FIG. 12 is another flowchart illustrating the operation of the $V_{REFOFF}$ process of the display, such as that of FIGS. 6, 7A, 7B, 8A, and 8B, according to an embodiment of the present disclosure.

FIGS. 11 and 12 provide a flowchart illustrating the operation of a display, such as that of FIGS. 6, 7A, 7B, 8A, and 8B, according to an embodiment of the present disclosure. SW1 708, SW2 710, and SW3 706 in FIG. 7A and SW4 806, SW5 810, and SW6 808 in FIG. 8A are used to allow the same test array to be shared or used alternately for $V_{REFON}$ and $V_{REFOFF}$ calibration. This serves to save die area, but is not a requirement. Two separate arrays could be used and provide some simplification. Because these are feedback circuits, it can be difficult to identify cause and effect when describing circuit action, thus the flowchart provided shows steps that can be sequential or concurrent. The resistive DAC components 712, 814 in this embodiment are 4-bit resistive DACs whose input settings are determined by programmable registers in the die. It is assumed that the default values for these registers are appropriately set during device initialization. Of course, other ways of setting these values are contemplated without deviating from the scope of the present disclosure.

Referring to FIG. 11, the $V_{REFON}$ process 1100 includes, at step 1102, the EQDATA decreases, EQUPDATE pulses high for 100 ns, SW1 708 is closed, SW2 710 is closed, and SW3 706 switches to the $V_{REFON}$ position for the 100 ns EQUPDATE pulse. At step 1104, during the 100 ns EQUPDATE pulse, the gates of the PFETs in the test array 704 are connected to the current $V_{REFON}$ voltage by SW3 706, biasing them on, the NFETs in the test array 705 are off as EQDATA is low, and the total PFET current from the test array flows to ground through SW2 710 and the resistive DAC 712. At step 1106, during the 100 ns EQUPDATE pulse, the test array current through the resistive DAC 712 generates a voltage proportional to the total PFET current, the voltage flows through SW1 708 and is buffered by op-amp 716 and becomes the updated voltage for $V_{REFON}$, and the updated voltage is fed back via SW3 706 to the gates of PFETs 704, forming a feedback loop that stabilizes $V_{REFON}$ to a desired value based on the resistive DAC 710 setting. At step 1108, during the 100 ns EQUPDATE pulse, the op-amp 716 input voltage is stored on the capacitor $C_{SAMPLE}$ 714. At step 110, after the 100 ns EQUPDATE pulse, EQDATA stays low, the EQUPDATE pulse ends and returns to 0, SW1 708 opens, SW2 710 opens, SW3 706 switches to the $V_{REFOFF}$ position, and the voltage in op-amp 716 output remains at the updated $V_{REFON}$ voltage due to the stored value on $C_{SAMPLE}$ 714. This process proceeds to the $V_{REFOFF}$ process for further EQDATA.

Referring to FIG. 12, the $V_{REFOFF}$ process 1200 includes, at step 1202, the EQDATA increases, SW4 806 is closed, SW5 810 is closed, SW6 808 is closed, and SW3 switches to the $V_{REFON}$ position for the 100 ns EQUPDATE pulse. At step 1204, during the 100 ns EQUPDATE pulse, the gates of the PFETs in the test array 804 are connected to the current $V_{REFOFF}$ voltage by SW3, biasing them on, the NFETs in the test array 805 are biased on by the gate voltage from the voltage divider RPU 812, the resistive DAC 814, and the current EQDATA voltage, and the NFET current flows through the PFETs, resulting in voltage through SW4 that is buffered by the op-amp and appears as the updated output $V_{REFOFF}$. At step 1206, during the 100 ns EQUPDATE pulse, the new voltage is fed back to SW3 and readjusts the gate voltage of the PFETs 804 and the negative feedback of this loop settles to the $V_{REFOFF}$ voltage that causes the gates of the PFETs to pass same current as the NFETs 805 proportional to the programmed value of the resistive DAC 814. At step 1208, during the 100 ns EQUPDATE pulse, the op-amp input voltage is stored on the capacitor $C_{SAMPLE}$ 816. At step 1210, after the 100 ns EQUPDATE pulse, the EQDATA stays high, the EQUPDATE pulse ends and returns to 0, SW4 806 is open, SW5 810 is open, SW6 808 is open, SW3 switches to the $V_{REFOFF}$ position, and the voltage in the op-amp output remains at the updated $V_{REFOFF}$ voltage due to the stored value on $C_{SAMPLE}$ 816. This process proceeds to the $V_{REFON}$ process for further EQDATA.

There are many benefits and advantages of embodiments of the present disclosure. For example, the embodiments herein enable the necessary digital circuitry to fit under the pixel electrode for very small pixel pitches, such as pixel pitches at or below about 6 μm, for example, while still retaining the full capabilities of the digital circuitry and also providing enough voltage to the pixel electrode. The digital displays enabled by the present disclosure are highly beneficial for various applications including, but not limited to, Virtual Reality (VR), Augmented Reality (AR), head-mounted glasses or other Head-Mounted Displays (HMD), and other small display/small pixel pitch applications. In addition, because of the size of the displays provided herein, a large number can be fabricated at once on a wafer, resulting in a low per-display cost.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated input, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks, Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A display comprising:

a plurality of pixels, each comprising a pixel electrode;

for each pixel electrode, a pixel circuit for supplying an output voltage to the pixel electrode, each pixel circuit comprising:

a plurality of memory storage units operating at a core voltage;

a level shift circuit connected to at least one of the plurality of memory storage units and comprising a first transistor and a second transistor, the level shift circuit converting the core voltage to an output voltage supplied to the pixel electrode, the core voltage being lower than the output voltage; and a plurality of update circuits, each update circuit being connected to a corresponding group of the pixels to provide an update signal to level shift circuits in its corresponding group of pixels, the update circuits being configured to provide their respective update signals with predetermined delays relative to each other to distribute current surge across the display.

2. The display of claim 1, wherein:

the update signals comprise voltage pulses switching from a voltage $V_{REFOFF}$ and a voltage $V_{REFON}$.

3. The display of claim 2, further comprising a $V_{REFON}$ generation circuit for generating and calibrating the voltage $V_{REFON}$, and a $V_{REFOFF}$ generation circuit for generating and calibrating the voltage $V_{REFOFF}$.

4. The display of claim 3, wherein each of the $V_{REFON}$ generation circuit and the $V_{REFOFF}$ generation circuit comprises a plurality of level-shift circuits.

5. The display of claim 4, wherein the plurality of level-shift circuits are located in a non-viewable portion of the display.

6. The display of claim 3, wherein the $V_{REFON}$ generation circuit and the $V_{REFOFF}$ generation circuit are both analog circuits.

7. The display of claim 3, wherein the $V_{REFON}$ generation circuit and the $V_{REFOFF}$ generation circuit employ A/D and D/A circuitry.

8. The display of claim 2, wherein:
the voltage $V_{REFON}$ and the voltage $V_{REFOFF}$ are analog voltages.

9. The display of claim 2, wherein:
the voltage $V_{REFOFF}$ is selected to result in a higher subthreshold current of the first transistor relative to a leakage current of the second transistor.

10. The display of claim 2, wherein:
the update signals cause an output terminal voltage of each level shift circuit to increase by between 0.5 millivolts and 5 millivolts during operation.

11. The display of claim 2, wherein a value of the voltage $V_{REFOFF}$ is below a turn-on threshold voltage of the first transistor.

12. The display of claim 1, wherein:
the predetermined delays between update signals of adjacent update circuits are between 3 nanoseconds and 50 nanoseconds.

13. The display of claim 1, wherein:
the predetermined delays are implemented using a shift register.

14. The display of claim 1, wherein:
each group of pixels comprises a plurality of columns of pixels in the display.

15. The display of claim 1, wherein a gate-voltage of the first transistor is controlled such that both an on-resistance and an off-resistance of the first transistor are lower than that of an off-resistance of the second transistor.

16. The display of claim 1, wherein the first transistor is a p-channel field-effect transistor (PFET) and the second transistor is an-channel field-effect transistor (NFET).

17. The display of claim 1, wherein a value of the core voltage is in a range of 0.9V-1.2V, and a value of the output voltage is 2V-4V.

18. The display of claim 1, wherein a dimension of the pixel circuit is at or less than 6 μm.

19. A display comprising a pixel circuit for supplying an output voltage to a pixel electrode in the display, the pixel circuit comprising:
a plurality of memory storage units operating at a core voltage;
a level shift circuit connected to at least one of the plurality of memory storage units and comprising a first transistor and a second transistor, the level shift circuit converting the core voltage to an output voltage supplied to the pixel electrode, the core voltage being lower than the output voltage; and
a plurality of update circuits, each update circuit being connected to a corresponding group of pixels of the display to provide an update signal to level shift circuits in its corresponding group of pixels, the update circuits being configured to provide their respective update signals with predetermined delays relative to each other to distribute current surge across the display.

20. A method, comprising:
operating one portion of a pixel circuit at a core voltage, the one portion of the pixel circuit comprising a plurality of memory storage units;
operating another portion of the pixel circuit at an output voltage using a level shift block, the core voltage being lower than the output voltage;
providing an update signal to a group of pixels via level shift blocks of the group of pixels, the update signal having a predetermined delay relative update signals provided to other groups of pixels to distribute current surge across a display; and
supplying the output voltage to a pixel electrode of the display.

* * * * *